(12) United States Patent
Takahashi

(10) Patent No.: US 10,623,810 B2
(45) Date of Patent: Apr. 14, 2020

(54) RECEIVING APPARATUS, RECEIVING METHOD, TRANSMISSION APPARATUS, AND TRANSMISSION METHOD

(71) Applicant: SATURN LICENSING LLC, New York, NY (US)

(72) Inventor: Kazuyuki Takahashi, Chiba (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 15/035,358

(22) PCT Filed: Jan. 6, 2015

(86) PCT No.: PCT/JP2015/050095
§ 371 (c)(1),
(2) Date: May 9, 2016

(87) PCT Pub. No.: WO2015/107929
PCT Pub. Date: Jul. 23, 2015

(65) Prior Publication Data
US 2016/0301968 A1 Oct. 13, 2016

(30) Foreign Application Priority Data

Jan. 17, 2014 (JP) ................................ 2014-006726

(51) Int. Cl.
*H04N 21/438* (2011.01)
*H04N 21/435* (2011.01)
(Continued)

(52) U.S. Cl.
CPC .......... *H04N 21/438* (2013.01); *H04H 60/13* (2013.01); *H04H 60/37* (2013.01); *H04H 60/44* (2013.01);
(Continued)

(58) Field of Classification Search
CPC .......... H04N 21/438; H04N 21/64322; H04N 21/2362; H04N 21/4345; H04N 21/435; H04H 60/44; H04H 60/13; H04H 60/37
See application file for complete search history.

(56) References Cited

U.S. PATENT DOCUMENTS

2010/0205645 A1 8/2010 Tokoshima et al.
2010/0218222 A1* 8/2010 Kim .................... H04N 21/235
725/54
(Continued)

FOREIGN PATENT DOCUMENTS

CN 1268846 A 10/2000
CN 1269671 A 10/2000
(Continued)

OTHER PUBLICATIONS

IPTV Forum Japan, "IPTV Standard, IP Broadcasting Specifications," IPTVFJ STD-0004, Version 1.3, Apr. 23, 2012, (30 pages) (with English-language translation).*
(Continued)

*Primary Examiner* — Kunal Langhnoja
(74) *Attorney, Agent, or Firm* — Oblon, McClelland, Maier & Neustadt, L.L.P.

(57) ABSTRACT

The present technology relates to a receiving apparatus, a receiving method, a transmission apparatus, and a transmission method that enable a service to be reliably identified. Provided is a receiving apparatus including a receiving unit configured to receive a broadcast wave of digital broadcasting employing an IP transmission scheme, and a control unit configured to identify a specific service provision source according to a combination of an original network ID allocated as a value unique to each broadcasting operator and having a same value succeeded in retransmission of a specific service, a stream ID allocated as a value unique to each stream, and a service ID allocated as a value unique to (Continued)

each service that is included in a control signal transmitted via the broadcast wave, and to control a function of each unit for performing predetermined processing related to the specific service. The present technology can be applied to, for example, a television receiver.

14 Claims, 15 Drawing Sheets

(51) Int. Cl.
    *H04N 21/2362*     (2011.01)
    *H04N 21/434*     (2011.01)
    *H04N 21/643*     (2011.01)
    *H04H 60/44*     (2008.01)
    *H04H 60/13*     (2008.01)
    *H04H 60/37*     (2008.01)

(52) U.S. Cl.
    CPC ....... *H04N 21/2362* (2013.01); *H04N 21/435* (2013.01); *H04N 21/4345* (2013.01); *H04N 21/64322* (2013.01)

(56) References Cited

U.S. PATENT DOCUMENTS

| | | | | |
|---|---|---|---|---|
| 2013/0173710 | A1* | 7/2013 | Seo | H04L 67/12 709/204 |
| 2014/0250479 | A1* | 9/2014 | Lee | H04N 7/08 725/110 |
| 2016/0212479 | A1* | 7/2016 | Kitazato | H04N 21/2362 |
| 2017/0019431 | A1* | 1/2017 | Kitahara | H04N 21/4385 |

FOREIGN PATENT DOCUMENTS

| | | |
|---|---|---|
| CN | 1571502 A | 1/2005 |
| CN | 103188527 A | 7/2013 |
| JP | 2011-193058 A | 9/2011 |

OTHER PUBLICATIONS

IPTV Forum Japan, "IPTV Standard, IP Broadcasting Specifications," IPTVSJ STD-0004, Version 1.3, Apr. 23, 2012, (30 pages) (with English-language translation).

Advanced Television Systems Committee, "ATSC Standard: Program and System Information Protocol for Terrestrial Broadcast and Cable," Document A65/2013, Aug. 7, 2013, (142 pages).

International Search Report dated Apr. 14, 2015 in PCT/JP2015/050095 filed Jan. 6, 2015.

Communication/Extended European Search Report, dated Aug. 2, 2017 for Application No. 15737591.6-1905/3096532 PCT/JP2015050095, 10 pages.

M. McRoberts, Ed., Uniform Resource Identifier (URI) Scheme for Digital Video Broadcasting (DVB) Programme Resources draft-mcroberts-uri-dvb-10, British Broadcasting Corporation, Mar. 26, 2013, 26 pages.

Combined Chinese Office Action and Search Report dated Jul. 31, 2018 in Patent Application No. 201580003790.1 (with English language translation).

IPTU Forum Japan; English Translation IPTV Standard; Overview; IPTVFJ STD-0001 Version 1.1; Created Sep. 1, 2008 (Version 1.0) and Revised on Sep. 16, 2009 (Version 1.1), 23 pages.

IPTU Forum Japan; English Translation IPTV Standard; IP Broadcasting Specification; IPTVFJ STD-0004 Version 1.2; Created on Sep. 1, 2008 (Version 1.0), Revised Nov. 28, 2008 (Version 1.1) and Revised on Jul. 30, 2010 (Version 1.2); 365 pages.

Japanese Office Action dated May 30, 2019, in Patent Application No. 2015-557786, 3 pages.

* cited by examiner

FIG. 4

| | Cardinality | |
|---|---|---|
| source_origin | | Service |
| @CountryCode | 1 | Country Code |
| @OriginalNetworkId | 1 | Original Network ID |
| @bbpStreamId | 1 | BBP Stream ID |
| @serviceId | 1 | Service ID |

RECEIVING APPARATUS, RECEIVING METHOD, TRANSMISSION APPARATUS, AND TRANSMISSION METHOD

TECHNICAL FIELD

The present technology relates to a receiving apparatus, a receiving method, a transmission apparatus, and a transmission method, and particularly to a receiving apparatus, a receiving method, a transmission apparatus, and a transmission method that enable a service to be reliably identified.

BACKGROUND ART

As a standard for US digital terrestrial television broadcasting, the Advanced Television Systems Committee (ATSC) scheme has been established (for example, refer to Non-Patent Document 1). In the current ATSC scheme, each service is identified by using a source_id described in a virtual channel table (VCT), which is information for a receiver selecting a broadcast signal.

CITATION LIST

Non-Patent Document

Non-Patent Document 1: Advanced Television Systems Committee, "ATSC Standard: Program and System Information Protocol for Terrestrial Broadcast and Cable", Document A65, Aug. 7, 2013

SUMMARY OF THE INVENTION

Problems to be Solved by the Invention

Meanwhile, in the current ATSC scheme, a source_id is used as an ID for identifying a service, but there is no registration authority (RA) for allocating a unique ID. Thus, overlap in ID may be generated among broadcast stations. For this reason, in the standard for the next-generation ATSC scheme, which is currently being formulated, there is a demand for enabling a service to be reliably identified by an ID that can specify a unique service.

The present technology has been devised in view of such situations, and enables a service to be reliably identified.

Solutions to Problems

A receiving apparatus according to a first aspect of the present technology includes a receiving unit configured to receive a broadcast wave of digital broadcasting employing an Internet Protocol (IP) transmission scheme, and a control unit configured to identify a specific service provision source according to a combination of an original network ID allocated as a value unique to each broadcasting operator and having a same value succeeded in retransmission of a specific service, a stream ID allocated as a value unique to each stream, and a service ID allocated as a value unique to each service that is included in a control signal transmitted via the broadcast wave, and to control a function of each unit for performing predetermined processing related to the specific service.

The control signal further includes a country code allocated to each country, and the control unit can identify the specific service provision source according to a combination of the original network ID, the stream ID, the service ID, and the country code.

The specific service can be streaming-delivered from a server via Internet.

An electronic service guide of the specific service can be provided from a server via Internet.

The original network ID can be allocated by a public agency, and the stream ID and the service ID can be allocated by each broadcasting operator.

A country code of a public agency can be designated as the country code.

The control signal can be described in an Extensible Markup Language (XML) format.

The receiving apparatus may be an independent apparatus, or may be an internal block constituting a single apparatus.

A receiving method according to the first aspect of the present technology is a receiving method corresponding to the above-described receiving apparatus according to the first aspect of the present technology.

In the receiving apparatus and the receiving method according to the first aspect of the present technology, a broadcast wave of digital broadcasting employing an IP transmission scheme is received, and a specific service provision source is identified according to a combination of an original network ID allocated as a value unique to each broadcasting operator and having a same value succeeded in retransmission of a specific service, a stream ID allocated as a value unique to each stream, and a service ID allocated as a value unique to each service that is included in a control signal transmitted via the broadcast wave, and a function of each unit for performing predetermined processing related to the specific service is controlled.

A transmission apparatus according to a second aspect of the present technology includes a first acquisition unit configured to acquire components constituting one or a plurality of services, a second acquisition unit configured to acquire a control signal including a combination of an original network ID allocated as a value unique to each broadcasting operator and having a same value succeeded in retransmission of a specific service, a stream ID allocated as a value unique to each stream, and a service ID allocated as a value unique to each service, and a transmission unit configured to transmit a broadcast wave being a broadcast wave of digital broadcasting employing an IP transmission scheme, and including the components constituting the one or the plurality of services and the control signal.

The transmission apparatus may be an independent apparatus, or may be an internal block constituting a single apparatus.

A transmission method according to the second aspect of the present technology is a transmission method corresponding to the above-described transmission apparatus according to the second aspect of the present technology.

In the transmission apparatus and the transmission method according to the second aspect of the present technology, components constituting one or a plurality of services are acquired, a control signal including a combination of an original network ID allocated as a value unique to each broadcasting operator and having a same value succeeded in retransmission of a specific service, a stream ID allocated as a value unique to each stream, and a service ID allocated as a value unique to each service is acquired, and a broadcast wave being a broadcast wave of digital broadcasting employing an IP transmission scheme, and including the components constituting the one or the plurality of services and the control signal is transmitted.

Effects of the Invention

According to the first and second aspects of the present technology, a service can be reliably identified.

The effect described here is not necessarily limited, and may be any effect described in the present disclosure.

BRIEF DESCRIPTION OF DRAWINGS

FIG. 4 is a diagram illustrating a description method of an ID system in digital broadcasting employing the IP transmission scheme.

MODE FOR CARRYING OUT THE INVENTION

An embodiment of the present technology will be described below with reference to the drawings. Assume that the description will be given in the following order.

1. Overview of Digital Broadcasting Employing IP Transmission Scheme
2. Details of Signaling Information
3. Configuration of Broadcast Communication System
4. Flow of Specific Processing Executed In Each Apparatus
5. Modified Example
6. Configuration of Computer

1. Overview of Digital Broadcasting Employing IP Transmission Scheme (Protocol Stack)

Figure 1:
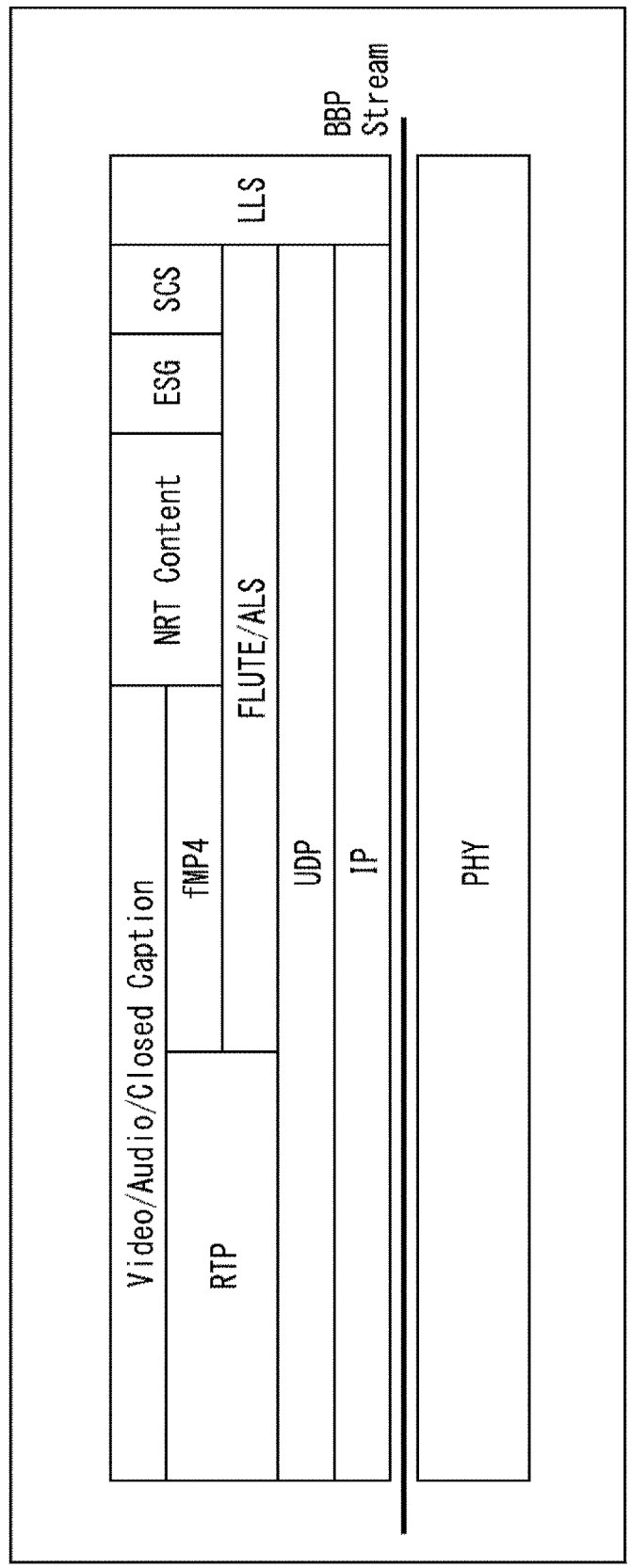
FIG. 1 is a diagram illustrating a protocol stack of digital broadcasting employing an IP transmission scheme.

FIG. 1 is a diagram illustrating a protocol stack of digital broadcasting employing the IP transmission scheme.

As illustrated in FIG. 1, the lowermost layer is a physical layer (Physical Layer), and a frequency band of a broadcast wave allocated for a service (channel) corresponds to this. An upper layer adjacent to the physical layer is an IP layer interposing a Base Band Packet Stream (BBP stream) therebetween. The BBP stream is a stream including a packet storing various types of data in the IP transmission scheme.

The IP layer corresponds to an Internet Protocol (IP) in a protocol stack of a TCP/IP, and an IP packet is specified by an IP address. An upper layer adjacent to the IP layer is a UDP layer, and further upper layers thereof are RTP and FLUTE/ALS. More specifically, in the digital broadcasting employing the IP transmission scheme, a packet in which a port number of a User Datagram Protocol (UDP) is designated is transmitted, and for example, a Real-time Transport Protocol (RTP) session or a File Delivery over Unidirectional Transport (FLUTE) session is established. In addition, the details of the FLUTE are defined as RFC3926.

An upper layer adjacent to the FLUTE/ALS is Fragmented MP4 (fMP4), and a further upper layer adjacent to the RTP and the fMP4 is video data (Video), audio data (Audio), closed caption data (Closed Caption), or the like. More specifically, when video data or audio data is transmitted in a synchronous stream format, the RTP session is used, and when video data or audio data is transmitted in an asynchronous file format, the FLUTE session is used.

In addition, upper layers of the FLUTE/ALS are NRT content, ESG, and SCS, and the NRT content, the ESG, and the SCS are transmitted using the FLUTE session. The NRT content is content transmitted in Non-Real Time (NRT) broadcasting. After the NRT content is once accumulated in a storage of a receiver, the NRT content is reproduced. In addition, the NRT content is an example of content, and a file of another content may be transmitted using the FLUTE session. The Electronic Service Guide (ESG) is an electronic service guide.

The Service Channel Signaling (SCS) is service-based signaling information, and is transmitted using the FLUTE session. For example, as the SCS, a Session Description Protocol (SDP), User Service Description (USD), Media Presentation Description (MPD), and the like are transmitted.

Low Layer Signaling (LLS) is signaling information of lower layers, and is transmitted on the BBP stream. For example, as the LLS, service configuration information (Service Configuration Information) such as a Service Configuration Table (SCT) and a Service Association Table (SAT) is transmitted.

(ID System in Digital Broadcasting Employing IP Transmission Scheme)

Figure 2:
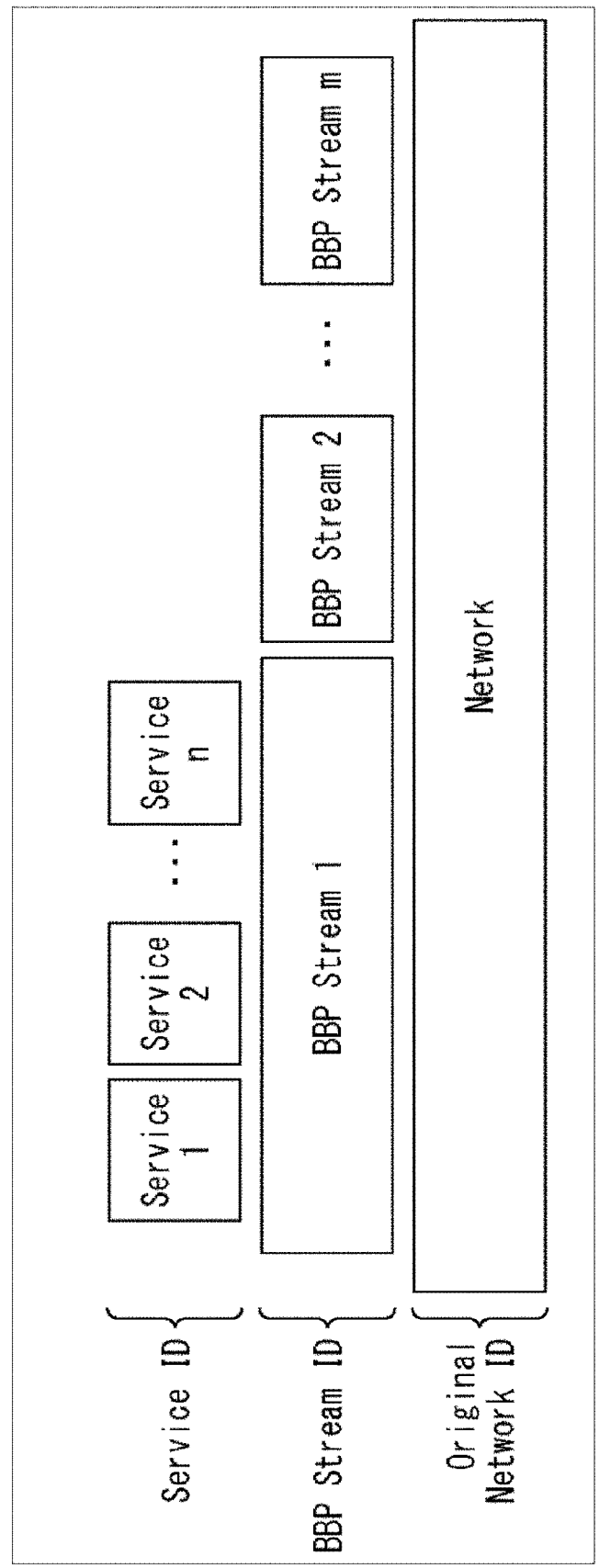
FIG. 2 is a diagram illustrating an ID system in digital broadcasting employing the IP transmission scheme.

FIG. 2 is a diagram illustrating an ID system in digital broadcasting employing the IP transmission scheme.

In digital broadcasting employing the IP transmission scheme, a configuration similar to a combination of a network ID, a transport stream ID, and a service ID (hereinafter, referred to as "triplet (Triplet)") that is used in the MPEG2-TS method is employed. This Triplet indicates a stream configuration and a service configuration in a broadcasting network. In this IP transmission scheme, however, a BBP stream ID corresponds to a transport stream ID in the MPEG2-TS method. In addition, in the IP transmission scheme, aside from the network ID, an original network ID having the same value succeeded in retransmission of a specific service is used.

As illustrated in FIG. 2, an original network ID is allocated to a broadcast wave (broadcasting network (Network)) having a predetermined frequency band. The broadcasting network includes 1 to m BBP streams (m is an integer of 1 or more) that are identified by BBP stream IDs. The BBP stream includes a plurality of BBP packets each constituted by a BBP header and a payload.

Each BBP stream includes 1 to n services (n is an integer of 1 or more) that are identified by service IDs. Each service is constituted by one or a plurality of components. The component is data for constituting each service, such as video data, audio data, and closed caption data, for example.

In this manner, in the digital broadcasting employing the IP transmission scheme, a unique ID is allocated to each service by using the Triplet constituted by the network ID, the BBP stream ID, and the service ID. In addition, in the digital broadcasting employing the IP transmission scheme, a specific service provision source can be identified by using the combination of the original network ID, the BBP stream ID, and the service ID.

2. Details of Signaling Information (Structure of Signaling Information)

Figure 3:
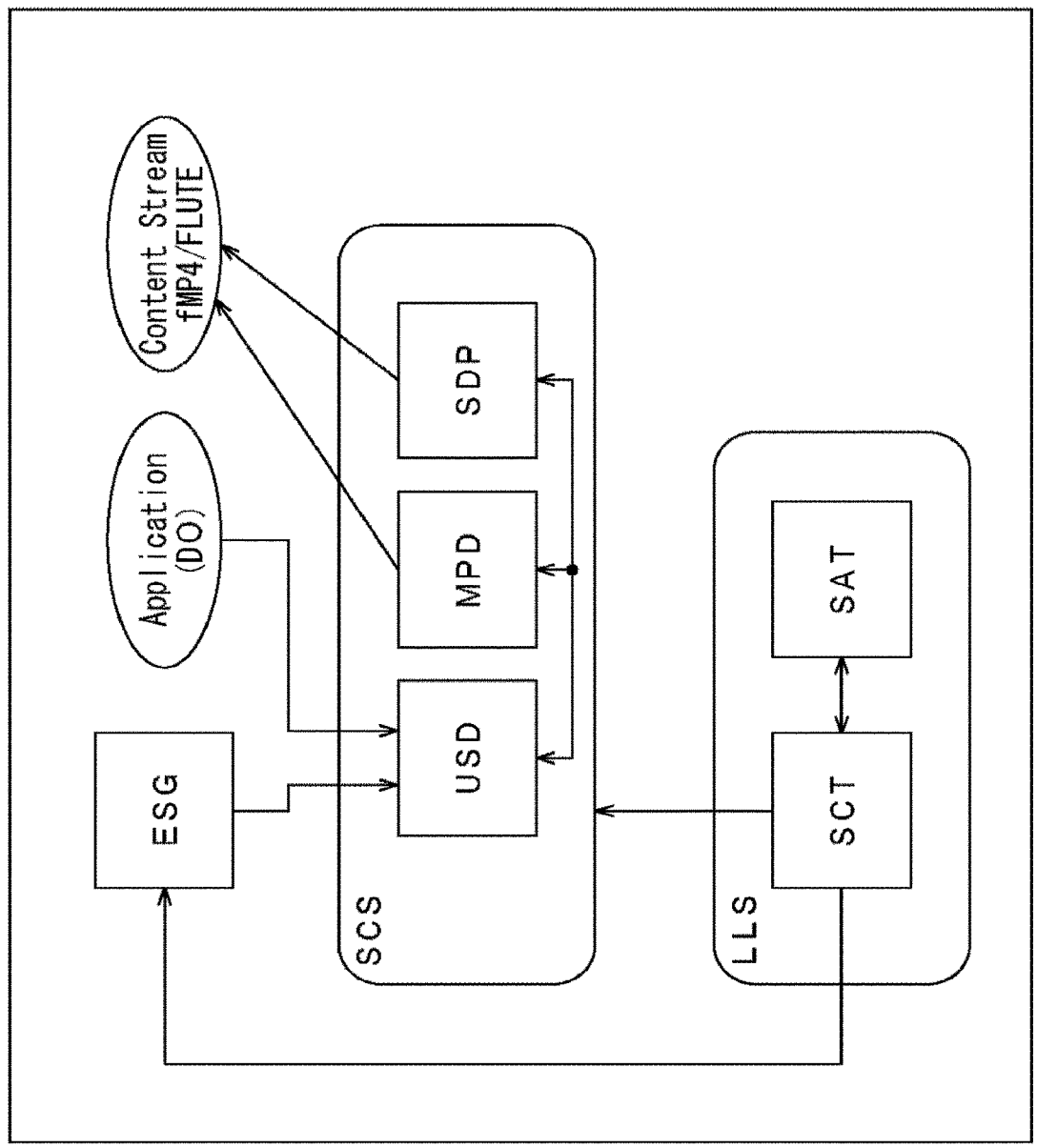
FIG. 3 is a diagram illustrating a structure of signaling information.

FIG. 3 is a diagram illustrating a structure of signaling information.

As described above, the SCT and the SAT are transmitted as the LLS. In the SCT, the Triplet is employed, and a service is specified by the network ID, the BBP stream ID, and the service ID. In addition, the SCT includes information such as an IP address serving as service-based attribute/setting information, bootstrap information for accessing the ESG and the SCS, and the like. The SAT indicates an on-air service of each BBP stream. It can be determined based on the SAT whether a specific service is on the air (being broadcasted).

In addition, the SDP, the MPD, and the USD are transmitted as the SCS. The SDP includes a service-based service attribute, configuration information of a component, a component attribute, filter information of the component, location information of the component, and the like. The MPD includes a segment Uniform Resource Locator (URL) for each component transmitted on a service basis. Based on the SDP and the MPD, content transmitted using, for example, the FLUTE session is specified. The USD is information for acquiring the SDP and the MPD, and is associated with an ESG or an application.

The ESG is an electronic service guide including, for example, information about a program title and start time. In addition, in the present embodiment, the description will be given of the ESG. Nevertheless, the same applies to the case of using an Electronic Program Guide (EPG). The application is formed by a file in a Hyper Text Markup Language (HTML) format, or the like, and is delivered from a server on the Internet. The application is executed in conjunction with broadcast content such as a television program that is provided as a specific service.

(Description Method of ID System)

FIG. 4 is a diagram illustrating a description method of an ID system in digital broadcasting employing the IP transmission scheme. This ID system is described in, for example, the SCT. In addition, the SCT is described in markup language such as, for example, Extensible Markup Language (XML). In FIG. 4, among elements and attributes, "@" are added to the attributes. In addition, indented elements and attributes are designated for their upper elements.

As illustrated in FIG. 4, a country code, an original network ID, a BBP stream ID, and a service ID are designated as attributes of a service provision source of a service element. In this example, aside from the above-described ID system, a country code is designated. A code allocated to each country is designated as the country code. It is desirable to designate a country code defined by a public agency because each country individually operates country codes. By allocating a country code, an ID can be made unique all over the world, across borders.

For example, in the United States, even in the case of being adjacent to Canada and Mexico across borders, by allocating country codes, overlap in ID can be avoided without separately defining a special ID allocation range. If it is assumed that an allocation purpose is designated for each predetermined region without using such country codes, fine predesignation is required for the operations of various countries and transmission routes. This decreases flexibility. By using country codes, international operations can be made available.

The original network ID is an ID for identifying a broadcasting network. As the original network ID, an ID unique to each broadcast station (broadcasting operator) is allocated by a regulator of each country (e.g., the Federal Communications Commission (FCC) in the United States). In addition, as described above, the network ID is also used as an ID for identifying a broadcasting network.

The BBP stream ID is an ID for identifying a BBP stream. In addition, the service ID is an ID for identifying a service. Each broadcast station (broadcasting operator) uniquely allocates BBP stream IDs and service IDs so as not to generate overlap.

Here, in the ID system in the digital broadcasting employing the IP transmission scheme, when a specific service is retransmitted by another broadcast station, the specific service is assumed to be transmitted without changing its original network ID, BBP stream ID, and service ID.

Figure 5:
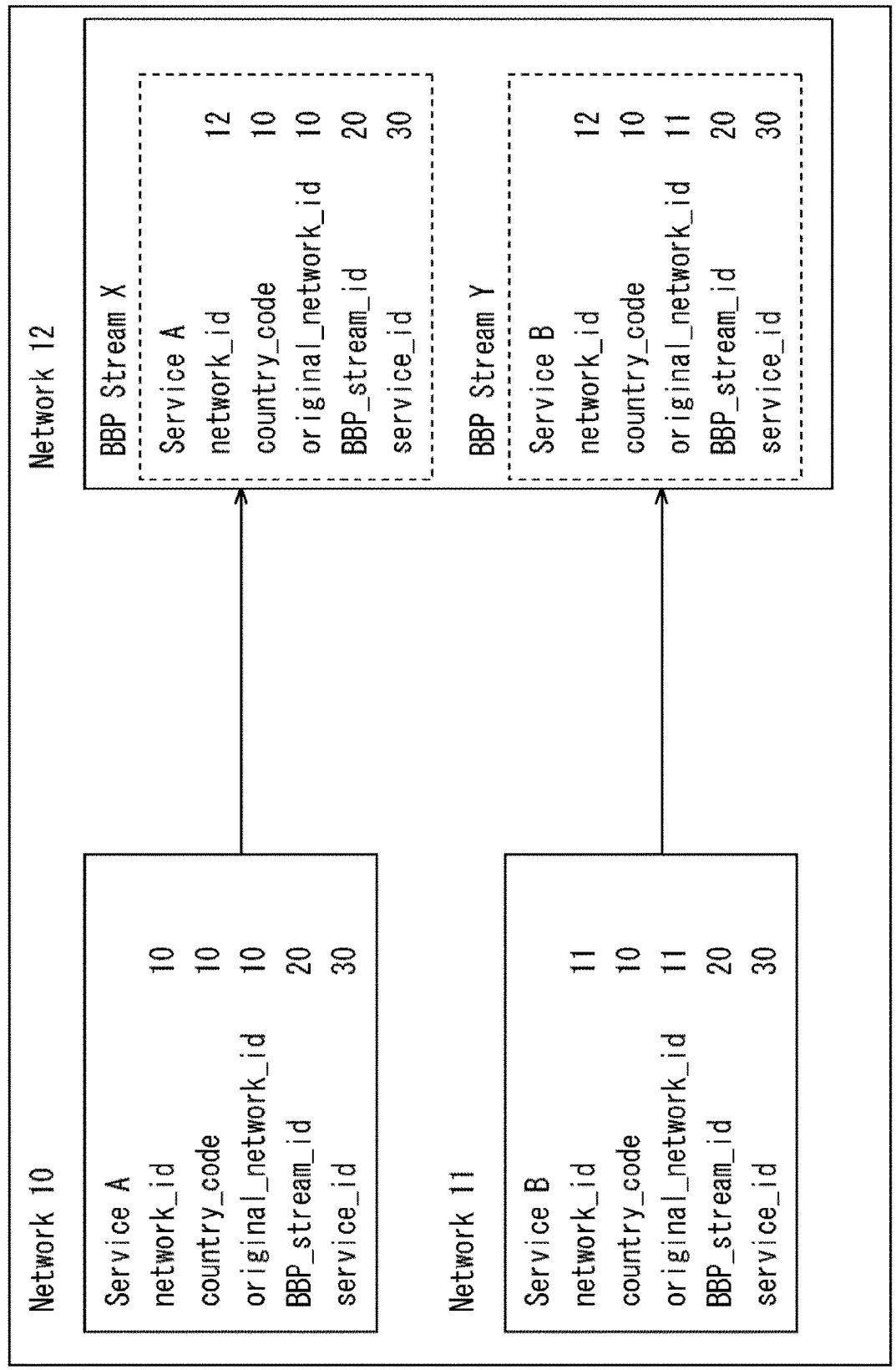
FIG. 5 is a diagram illustrating a specific example of an Original Network ID.

Specifically, as illustrated in FIG. 5, an assumption is made on a situation in which a service A provided by a broadcast station with a network ID "10" (Network 10) and a service B provided by a broadcast station with a network ID "11" (Network 11) are retransmitted by another broadcast station with a network ID "12" (Network 12). In this situation, as an original network ID of the service A retransmitted by the other broadcast station (Network 12), an original network ID "10" of a provision source of the service is designated. Similarly, as an original network ID of the service B retransmitted by the other broadcast station (Network 12), an original network ID "11" of a provision source of the service is designated.

In other words, even to the services A and B transmitted by the other broadcast station (Network 12), in the case of services to be retransmitted, the network ID "12" allocated to the other broadcast station (Network 12) is not designated, but the original network IDs "10" and "11" allocated to broadcast stations (Networks 10 and 11) of provision sources of the services are designated.

In this manner, when a specific service is retransmitted, an ID system for identifying the specific service is succeeded, and the same value is set. It is thereby specified that the specific service is a unique service, irrespective of the form of retransmission. For example, in the coming years, a broadcasted television program is assumed to be redelivered on the Internet, in addition to being rebroadcasted via cable television or satellite broadcasting. Even in such a case, a television program to be redelivered can be specified by an ID system having the same value allocated to the television program as that allocated in an ID system when the television program had been broadcasted. In addition, for example, when an ESG server for providing an ESG is provided on the Internet, in the ESG server, a sole unique service can be specified by the ID system, and an ESG of the specified service can be provided.

Figure 6:
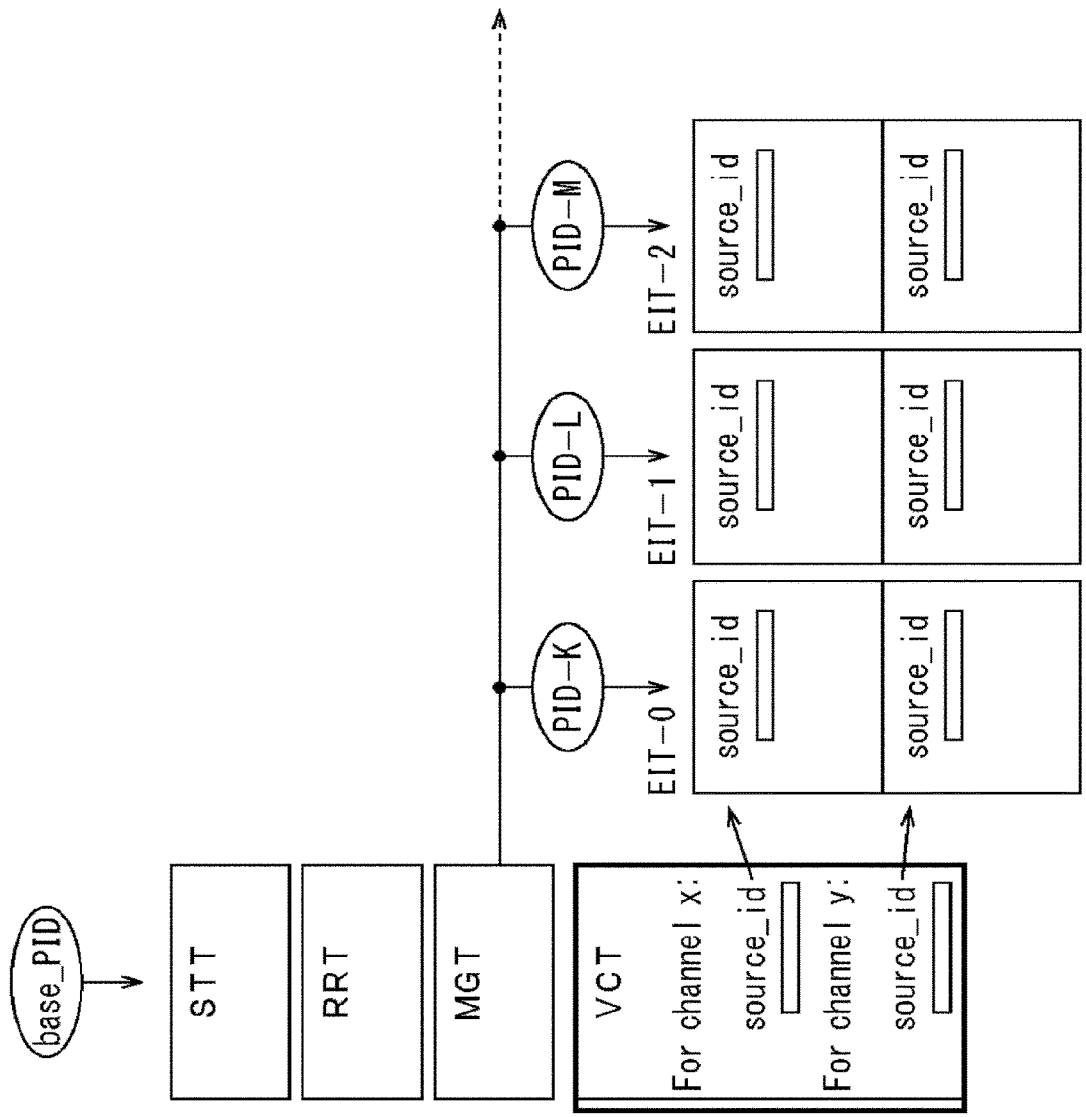
FIG. 6 is a diagram illustrating comparison with a source_id defined in the current ATSC.

In addition, as illustrated in FIG. 6, in the current ATSC scheme, each service is identified by a source_id described in the VCT, which is information for a receiver selecting a broadcast signal. Among values allocated to such source_ids, "0x000" is allocated as a reserved value, values ranging from "0x0001" to "0x0fff" are allocated as values unique in a broadcast station, and values ranging from "0x1000" to "0xffff" are allocated as values determined by a Registration Authority (RA). Nevertheless, in actuality, there is no RA that allocates unique IDs. Thus, overlap in ID for identifying a service may be generated among broadcast stations. It has been therefore unable to specify a service as a unique service. In contrast, in the above-described ID system, each service can be specified as a unique service by the combination of an original network ID, a BBP stream ID, a service ID, and a country code. Thus, it becomes possible to reliably identify a service.

In addition, in the example illustrated in FIG. 4, "1" is designated as Cardinality for respective attributes of service elements, and these attributes are indicated as essential attributes. Nevertheless, the attribute of the country code does not necessarily have to be designated. In addition, it is preferable that the SCT is transmitted with being described in markup language such as the XML because the SCT can be easily extended when new extension is required in the future. Nevertheless, the SCT may be transmitted using another transmission method.

3. Configuration of Broadcast Communication System (Configuration Example of Broadcast Communication System)

Figure 7:
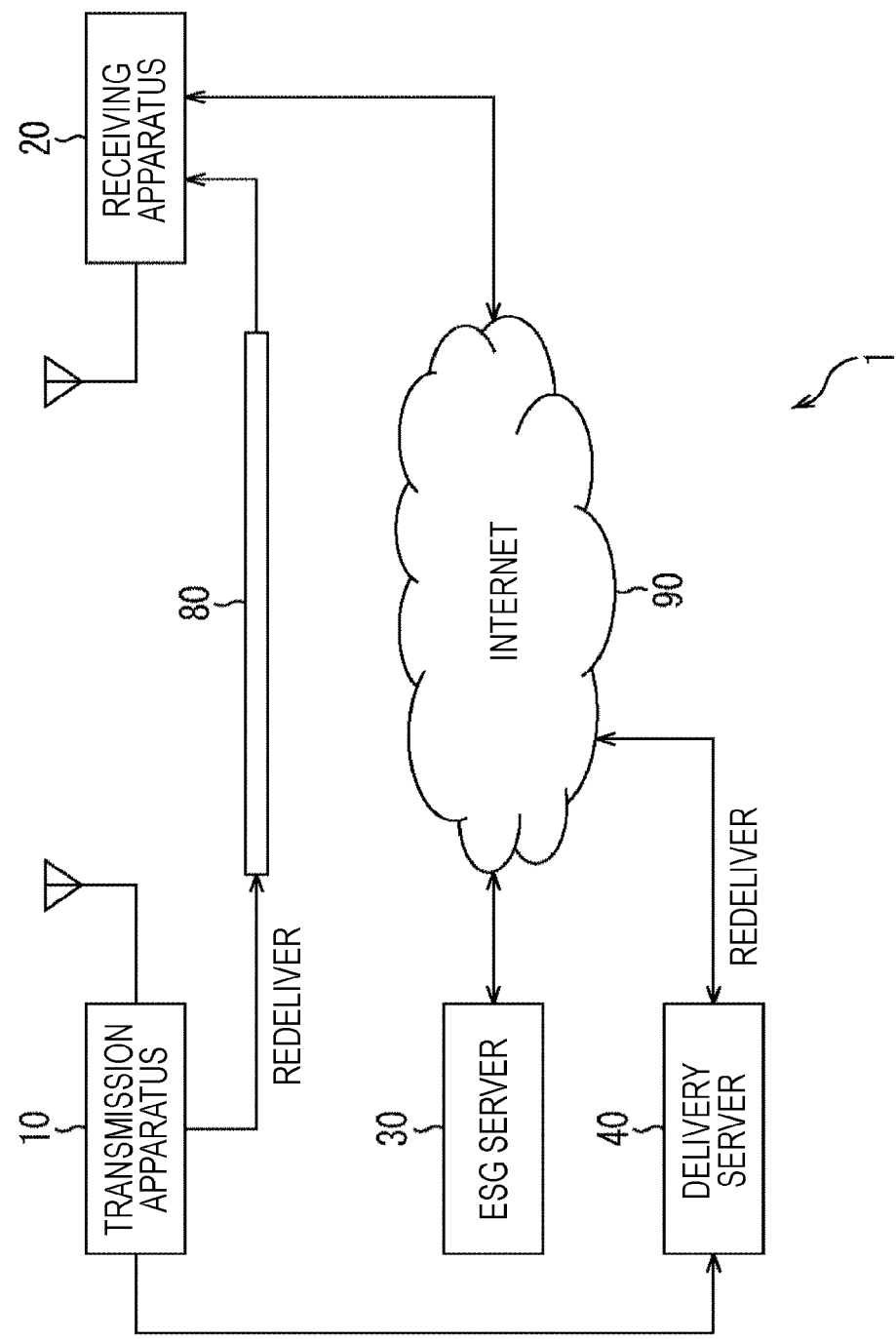
FIG. 7 is a diagram illustrating a configuration of an embodiment of a broadcast communication system to which the present technology is applied.

FIG. 7 is a diagram illustrating a configuration of an embodiment of a broadcast communication system to which the present technology is applied.

As illustrated in FIG. 7, a broadcast communication system 1 includes a transmission apparatus 10, a receiving apparatus 20, an ESG server 30, and a delivery server 40. In addition, the receiving apparatus 20, and the ESG server 30 and the delivery server 40 are connected to each other via an Internet 90. Furthermore, the transmission apparatus 10 and the delivery server 40 are connected via a dedicated line or the like. In addition, when the transmission apparatus 10 can provide a service of cable television, the transmission apparatus 10 and the receiving apparatus 20 can be connected via a cable 80.

The transmission apparatus 10 transmits broadcast content such as a television program provided as a specific service, via a broadcast wave of digital broadcasting. In addition, the broadcast content is constituted by components such as video, audio, and closed caption. In addition, together with the components constituting the service, the transmission apparatus 10 transmits a control signal (signaling information in FIG. 3) via the broadcast wave of digital broadcasting. In addition, when the transmission apparatus 10 can provide the service of cable television, the transmission apparatus 10 can transmit (redeliver), via the cable 80, a broadcasted television program provided as a specific service, or the like, as broadcast content.

The receiving apparatus 20 receives a broadcast signal transmitted from the transmission apparatus 10. Based on a control signal obtained from the broadcast signal, the receiving apparatus 20 acquires components such as video, audio, and closed caption, and outputs video and audio of broadcast content such as a television program. In addition, when the transmission apparatus 10 can provide the service of cable television, the receiving apparatus 20 can receive, via the cable 80, a broadcast signal transmitted from the transmission apparatus 10, and output video and audio of broadcast content such as a broadcasted television program. In addition, the receiving apparatus 20 may include a display and a loudspeaker to be formed as an independent apparatus. Alternatively, the receiving apparatus 20 may be built into a television receiver, a video recorder, or the like.

The ESG server 30 manages an electronic service guide (ESG) of a television program. In response to a request from the receiving apparatus 20, the ESG server 30 provides, via the Internet 90, an ESG of a specific television program to the receiving apparatus 20. The receiving apparatus 20 holds the ESG provided from the ESG server 30 via the Internet 90, and displays the ESG at a predetermined timing.

In response to a request from the receiving apparatus 20, the delivery server 40 streaming-delivers (redelivers) communication content such as a broadcasted television program or a released movie that is provided as a specific service. In addition, the communication content is constituted by components such as video, audio, and closed caption, and is provided from, for example, the transmission apparatus 10 via a dedicated line or the like. The receiving apparatus 20 receives data streaming-delivered from the delivery server 40 via the Internet 90, and outputs video and audio of communication content such as a broadcasted television program.

The broadcast communication system 1 has the above-described configuration. Next, the detailed configurations of the apparatuses included in the broadcast communication system 1 illustrated in FIG. 7 will be described with reference to FIGS. 8 to 11.

(Configuration Example of Transmission Apparatus)

Figure 8:
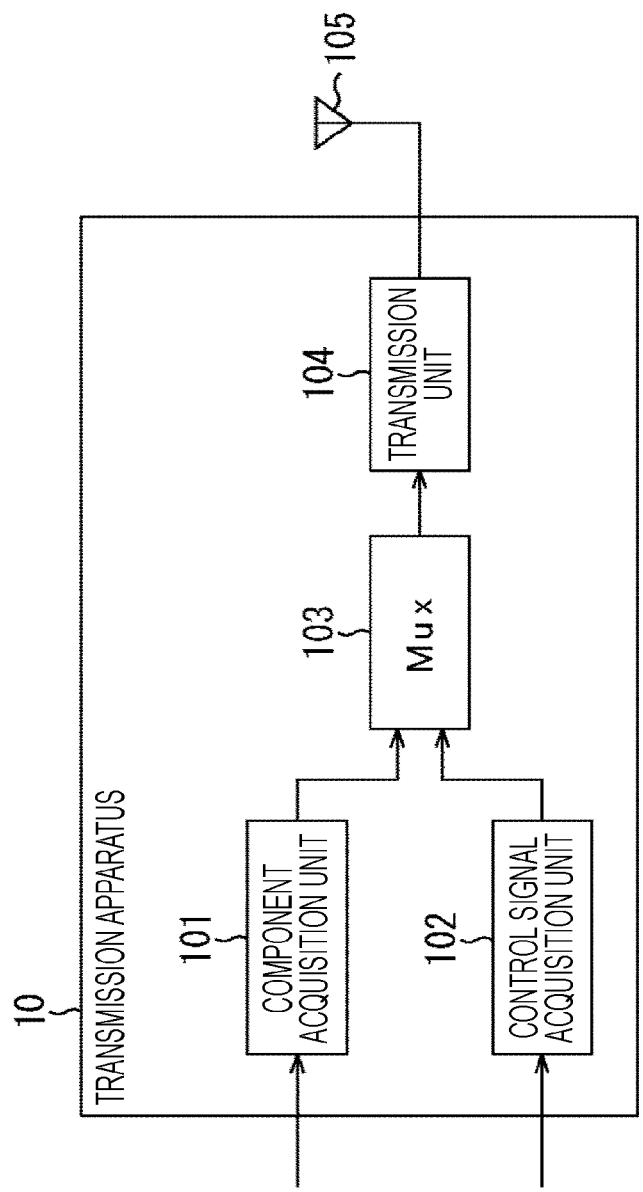
FIG. 8 is a diagram illustrating a configuration of an embodiment of a transmission apparatus to which the present technology is applied.

FIG. 8 is a diagram illustrating a configuration example of the transmission apparatus 10 illustrated in FIG. 7.

As illustrated in FIG. 8, the transmission apparatus 10 includes a component acquisition unit 101, a control signal acquisition unit 102, a Mux 103, and a transmission unit 104.

The component acquisition unit 101 acquires various types of components such as video, audio, and closed caption, from an external server, an internal storage, or the like, and supplies the acquired components to the Mux 103. The control signal acquisition unit 102 acquires a control signal (signaling information in FIG. 3) from an external server, an internal storage, or the like, and supplies the acquired control signal to the Mux 103.

The Mux 103 multiplexes the various types of components from the component acquisition unit 101 and the control signal from the control signal acquisition unit 102 to generate a BBP stream, and supplies the generated BBP stream to the transmission unit 104. The transmission unit 104 transmits the BBP stream supplied from the Mux 103, as a broadcast signal, via an antenna 105.

(Configuration Example of Receiving Apparatus)

Figure 9:
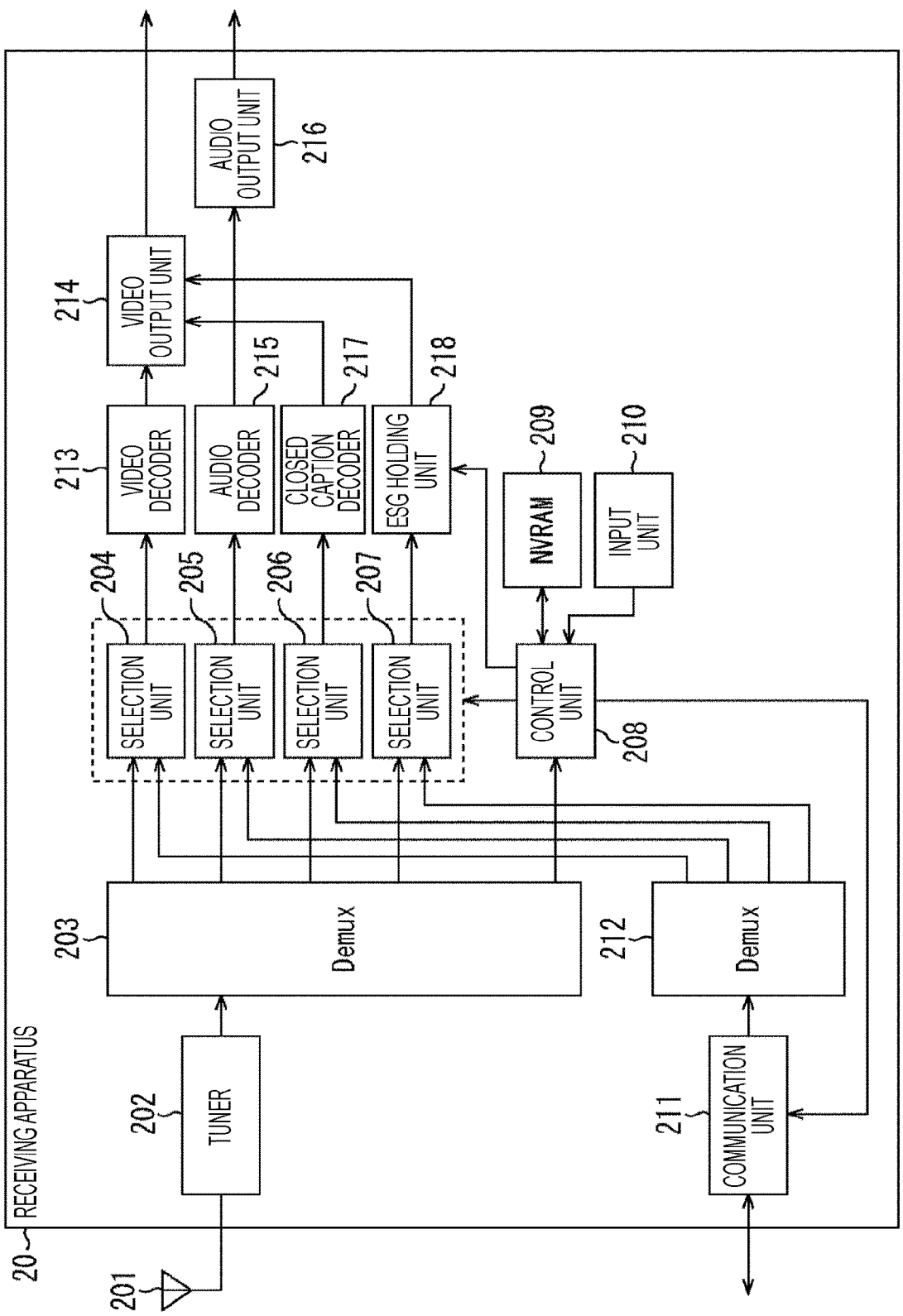
FIG. 9 is a diagram illustrating a configuration of an embodiment of a receiving apparatus to which the present technology is applied.

FIG. 9 is a diagram illustrating a configuration example of the receiving apparatus 20 illustrated in FIG. 7.

As illustrated in FIG. 9, the receiving apparatus 20 includes a tuner 202, a Demux 203, selection units 204, 205, 206, and 207, a control unit 208, a NVRAM 209, an input unit 210, a communication unit 211, a Demux 212, a video decoder 213, a video output unit 214, an audio decoder 215, an audio output unit 216, a closed caption decoder 217, and an ESG holding unit 218.

The tuner 202 extracts a broadcast signal of a service selected according to an instruction, from broadcast signals received from an antenna 201, and demodulates the extracted broadcast signal. The tuner 202 then supplies a resultant BBP stream to the Demux 203.

The Demux 203 demultiplexes the BBP stream supplied from the tuner 202, into components, ESG data, and a control signal, and supplies the components and the ESG data to the respective selection unit 204 to 207, and the control signal to the control unit 208. In this example, as the components, the BBP stream is demultiplexed into a video component, an audio component, and a closed caption component, and these components are supplied to the respective selection units 204, 205, and 206. In addition, the ESG data is supplied to the selection unit 207.

The control unit 208 controls the functions of the units in the receiving apparatus 20. The NVRAM 209 is a nonvolatile random access memory, and records various types of data according to the control from the control unit 208. For example, the control unit 208 records channel selection information obtained from a control signal (signaling information in FIG. 3) supplied from the Demux 203, on the NVRAM 209. Based on the channel selection information recorded on the NVRAM 209, the control unit 208 controls channel selection processing performed by the tuner 202. In addition, the control unit 208 controls selection processing performed by the selection units 204 to 207.

The input unit 210 supplies a manipulation signal to the control unit 208 according to manipulation of a user. Based on the manipulation signal from the input unit 210, the control unit 208 controls the functions of the units in the receiving apparatus 20.

According to the control from the control unit 208, the communication unit 211 exchanges various types of data with the ESG server 30 or the delivery server 40 via the Internet 90. The communication unit 211 supplies ESG data received from the ESG server 30, to the selection unit 207 via the Demux 212. In addition, the communication unit 211 supplies stream data received from the delivery server 40, to the Demux 212.

The Demux 212 demultiplexes the stream data supplied from the communication unit 211, into components, and supplies the components to the respective selection units 204 to 206. In this example, among the components obtained after demultiplexing, the video component, the audio component, and the closed caption component are supplied to the selection units 204, 205, and 206, respectively.

According to the control from the control unit 208, the selection unit 204 selects either one of the video component from the Demux 203 and the video component from the Demux 212, and supplies the selected video component to the video decoder 213.

The video decoder 213 decodes the video component supplied from the selection unit 204, and supplies resultant video data to the video output unit 214. The video output unit 214 outputs the video data supplied from the video decoder 213, to a display (not illustrated) on a subsequent stage. As a result, for example, a video of a television program is displayed on the display.

According to the control from the control unit 208, the selection unit 205 selects either one of the audio component from the Demux 203 and the audio component from the Demux 212, and supplies the selected audio component to the audio decoder 215.

The audio decoder 215 decodes the audio component supplied from the selection unit 205, and supplies resultant audio data to the audio output unit 216. The audio output unit 216 outputs the audio data supplied from the audio decoder 215, to a loudspeaker (not illustrated) on a subsequent stage. As a result, for example, audio synchronized with the video of the television program is output from the loudspeaker.

According to the control from the control unit 208, the selection unit 206 selects either one of the closed caption component from the Demux 203 and the closed caption component from the Demux 212, and supplies the selected closed caption component to the closed caption decoder 217.

The closed caption decoder 217 decodes the closed caption component supplied from the selection unit 206, and supplies resultant closed caption data to the video output unit 214. If closed caption data is supplied from the closed caption decoder 217, the video output unit 214 synthesizes the closed caption data with the video data from the video decoder 213, and supplies resultant data to the display (not illustrated) on a subsequent stage. As a result, for example, together with a video of a television program, closed caption synchronized with the video is displayed on the display.

According to the control from the control unit 208, the selection unit 207 selects either one of the ESG data from the Demux 203 and the ESG data from the Demux 212, and supplies the selected ESG data to the ESG holding unit 218.

The ESG holding unit 218 holds the ESG data supplied from the selection unit 207. According to the control from the control unit 208, the ESG holding unit 218 supplies the ESG data held therein, to the video output unit 214. If ESG data is supplied from the ESG holding unit 218, the video output unit 214 supplies the ESG data to the display (not illustrated) on a subsequent stage. As a result, an ESG is displayed on the display.

(Configuration Example of ESG Server)

Figure 10:
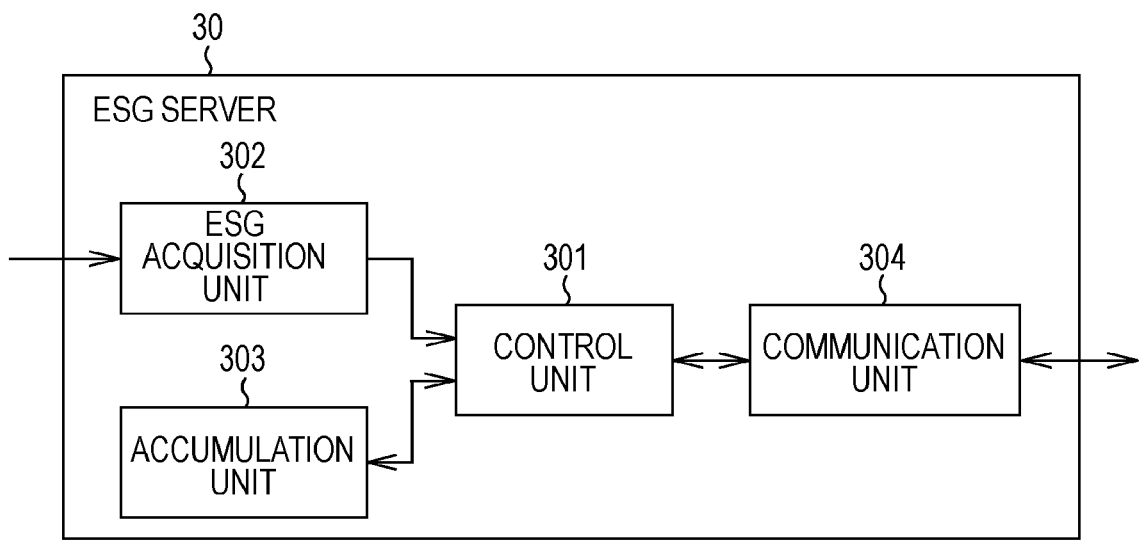
FIG. 10 is a diagram illustrating a configuration example of an ESG server.

FIG. 10 is a diagram illustrating a configuration example of the ESG server 30 illustrated in FIG. 7.

As illustrated in FIG. 10, the ESG server 30 includes a control unit 301, an ESG acquisition unit 302, an accumulation unit 303, and a communication unit 304.

The control unit 301 controls the functions of the units in the ESG server 30. The ESG acquisition unit 302 acquires ESG data from an external server, an internal storage, or the like, and supplies the ESG data to the control unit 301. The control unit 301 accumulates the ESG data from the ESG acquisition unit 302, into the accumulation unit 303. As a result, for example, ESG data of each country and region are accumulated in the accumulation unit 303.

According to the control from the control unit 301, the communication unit 304 exchanges various types of data with the receiving apparatus 20 via the Internet 90. If a request for an ESG is received from the receiving apparatus 20, the control unit 301 reads ESG data corresponding to the request, from the accumulation unit 303. The control unit 301 controls the communication unit 304 to transmit the ESG data read from the accumulation unit 303, to the receiving apparatus 20 via the Internet 90.

(Configuration Example of Delivery Server)

Figure 11:
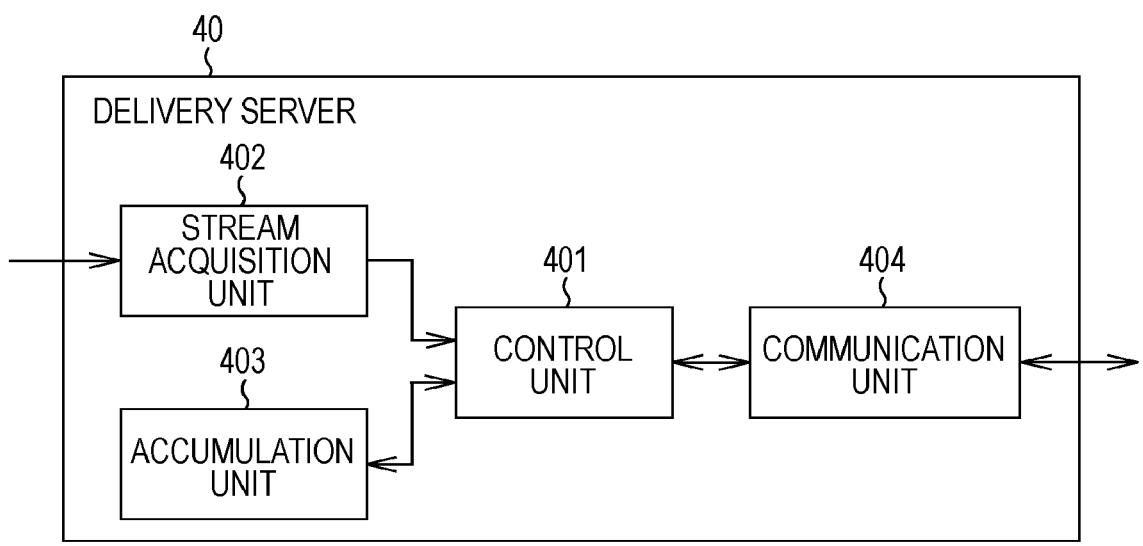
FIG. 11 is a diagram illustrating a configuration example of a delivery server.

FIG. 11 is a diagram illustrating a configuration example of the delivery server 40 illustrated in FIG. 7.

As illustrated in FIG. 11, the delivery server 40 includes a control unit 401, a stream acquisition unit 402, an accumulation unit 403, and a communication unit 404.

The control unit 401 controls the functions of the units in the delivery server 40. The stream acquisition unit 402 acquires stream data of a broadcasted television program or the like from the transmission apparatus 10 via a dedicated line or the like, and supplies the acquired stream data to the control unit 401. The control unit 401 accumulates the stream data from the stream acquisition unit 402, into the accumulation unit 403. As a result, for example, stream data of television programs broadcasted in broadcast stations of each country are accumulated as communication content in the accumulation unit 403.

According to the control from the control unit 401, the communication unit 404 exchanges various types of data with the receiving apparatus 20 via the Internet 90. If a delivery request for a specific service is received from the receiving apparatus 20, the control unit 401 reads streaming data corresponding to the request, from the accumulation unit 403. The control unit 401 controls the communication unit 404 to transmit the streaming data read from the accumulation unit 403, to the receiving apparatus 20 via the Internet 90.

4. Flow of Specific Processing Executed in Each Apparatus

Next, flows of specific processing executed in the respective apparatuses included in the broadcast communication system 1 illustrated in FIG. 7 will be described with reference to FIGS. 12 to 15.

(Transmission Processing)

Figure 12:
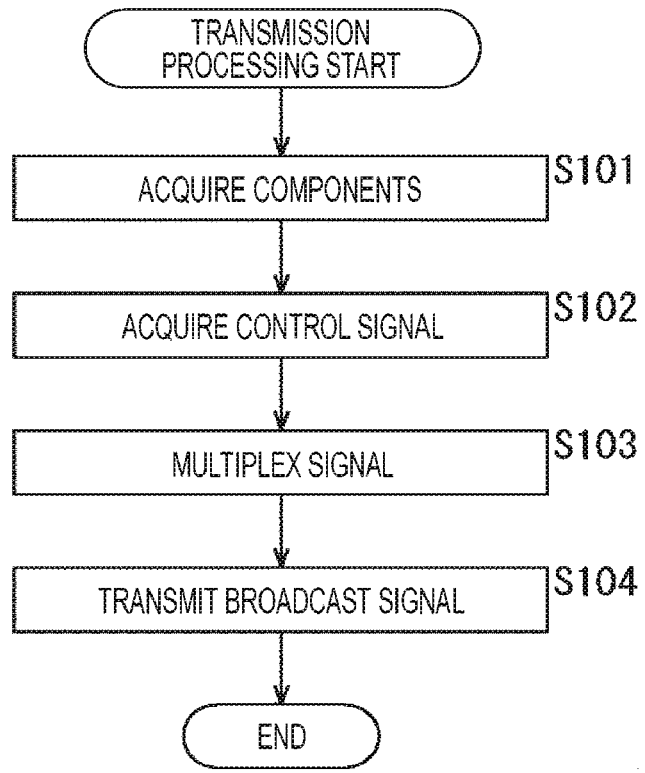
FIG. 12 is a flowchart illustrating transmission processing.

First, transmission processing executed by the transmission apparatus 10 illustrated in FIG. 7 will be described with reference to a flowchart illustrated in FIG. 12.

In step S101, the component acquisition unit 101 acquires various types of components from an external server, an internal storage, or the like, and supplies the acquired components to the Mux 103. In step S102, the control signal acquisition unit 102 acquires a control signal (signaling information in FIG. 3) from an external server or the like, and supplies the acquired control signal to the Mux 103.

In step S103, the Mux 103 multiplexes the various types of components from the component acquisition unit 101 and the control signal from the control signal acquisition unit 102 to generate a BBP stream, and supplies the generated BBP stream to the transmission unit 104. In step S104, the transmission unit 104 transmits the BBP stream supplied from the Mux 103, as a broadcast signal, via the antenna 105. When the processing in step S104 is ended, the transmission processing illustrated in FIG. 12 is ended.

The transmission processing has been described above. In the transmission processing, the BBP stream obtained by multiplexing the components such as video and audio, and the control signal is transmitted via the broadcast wave. A provision source of each service constituted by these components is identified by an ID system constituted by combinations of original network IDs, BBP stream IDs, service IDs, and country codes described in the SCT, which serves as one of control signals.

(Receiving Processing)

Figure 13:
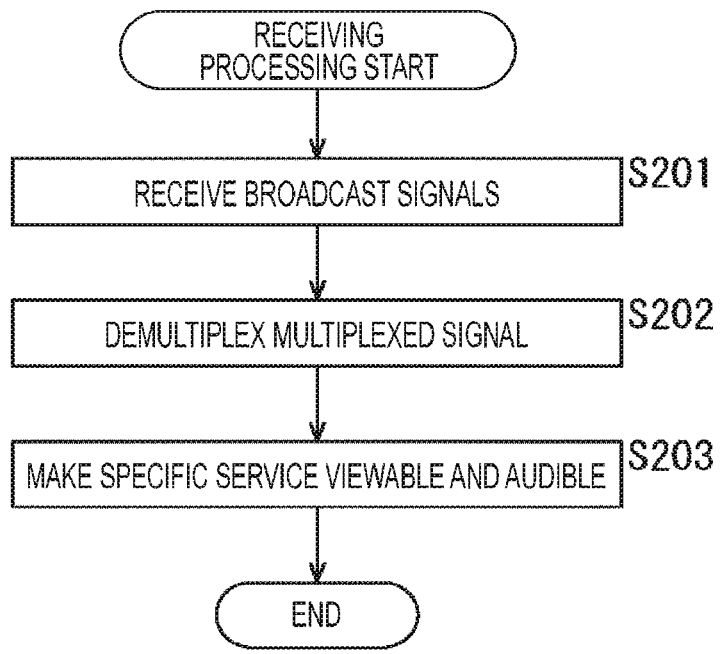
FIG. 13 is a flowchart illustrating receiving processing.

Next, receiving processing executed by the receiving apparatus 20 illustrated in FIG. 7 will be described with reference to a flowchart illustrated in FIG. 13. In addition, the receiving processing is executed when the receiving apparatus 20 is activated, and a specific service is selected by the user manipulating a remote controller, or the like.

In step S201, according to the control from the control unit 208, the tuner 202 receives broadcast signals via the antenna 201, extracts, from the broadcast signals, a broadcast signal of a service selected according to an instruction, and demodulates the extracted broadcast signal. In addition, in step S202, the Demux 203 demultiplexes a BBP stream from the tuner 202, into components and a control signal.

In step S203, according to the control from the control unit 208, the video decoder 213 performs decoding processing, and supplies resultant video data to the video output unit 214. In addition, according to the control from the control unit 208, the audio decoder 215 performs decoding processing, and supplies resultant audio data to the audio output unit 216. As a result, the specific service selected by the user manipulating the remote controller becomes viewable and audible.

The receiving processing has been described above. In the receiving processing, the components such as video and audio of the specific service selected by the user manipulating the remote controller are decoded, so that the specific service becomes viewable and audible. A provision source of the specific service is identified by an ID system constituted by combinations of original network IDs, BBP stream IDs, service IDs, and country codes described in the SCT.

(ESG Providing Processing)

Figure 14:
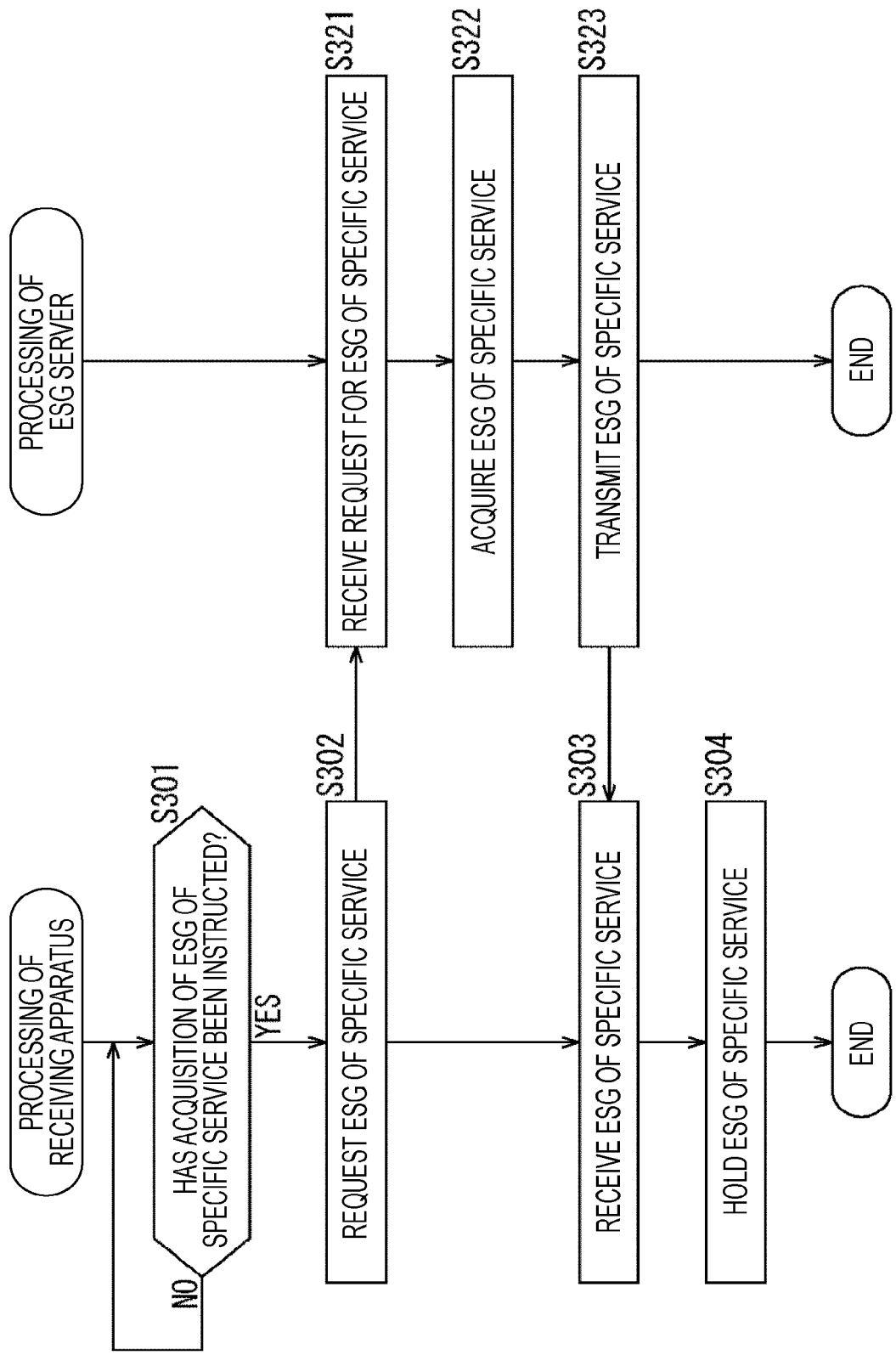
FIG. 14 is a flowchart illustrating ESG providing processing.

Next, ESG providing processing executed between the receiving apparatus 20 and the ESG server 30 that are illustrated in FIG. 7 will be described with reference to a flowchart illustrated in FIG. 14. In addition, in the flowchart illustrated in FIG. 14, processing in steps S301 to S304 is executed by the receiving apparatus 20, and processing in steps S321 to S323 is executed by the ESG server 30.

In step S301, it is determined whether acquisition of an ESG of a specific service has been instructed. When it is determined in step S301 that the acquisition of the ESG of the specific service ESG has been instructed, the processing proceeds to step S302. In step S302, according to the control from the control unit 208, the communication unit 211 requests the ESG of the specific service from the ESG server 30 via the Internet 90. Here, it is assumed that a provision source of this specific service is designated by the ID system illustrated in FIG. 4 that is constituted by combinations of original network IDs, BBP stream IDs, service IDs, and country codes.

In step S321, according to the control from the control unit 301, the communication unit 304 receives a request for an ESG of a specific service provision source that is transmitted from the receiving apparatus 20 via the Internet 90. In step S322, based on the request for the ESG of the specific service provision source, the control unit 301 acquires ESG data designated by the ID system illustrated in FIG. 4 that is included in the request for the ESG, from among ESG data accumulated in the accumulation unit 303. In step S323, according to the control from the control unit 301, the communication unit 304 transmits the ESG data acquired in response to the request for the ESG, to the receiving apparatus 20 via the Internet 90.

In step S303, according to the control from the control unit 208, the communication unit 211 receives the ESG data of the specific service provision source that is transmitted from the ESG server 30 via the Internet 90. In step S304, the ESG holding unit 218 holds the ESG data received by the communication unit 211. As a result, the ESG data of the specific service provision source designated by the ID system illustrated in FIG. 4 is held in the ESG holding unit 218. In addition, for example, if the display of the ESG is instructed by the user manipulating the remote controller, the ESG data held in the ESG holding unit 218 is supplied to the video output unit 214, and displayed on the display.

The ESG providing processing has been described above. In the ESG providing processing, the specific service provision source is designated by the ID system constituted by the combinations of original network IDs, BBP stream IDs, service IDs, and country codes. Thus, the ESG data of the specific service provision source can be acquired from among ESG data of each country and region that are accumulated in the ESG server 30, and provided.

(Streaming Delivery Processing)

Figure 15:
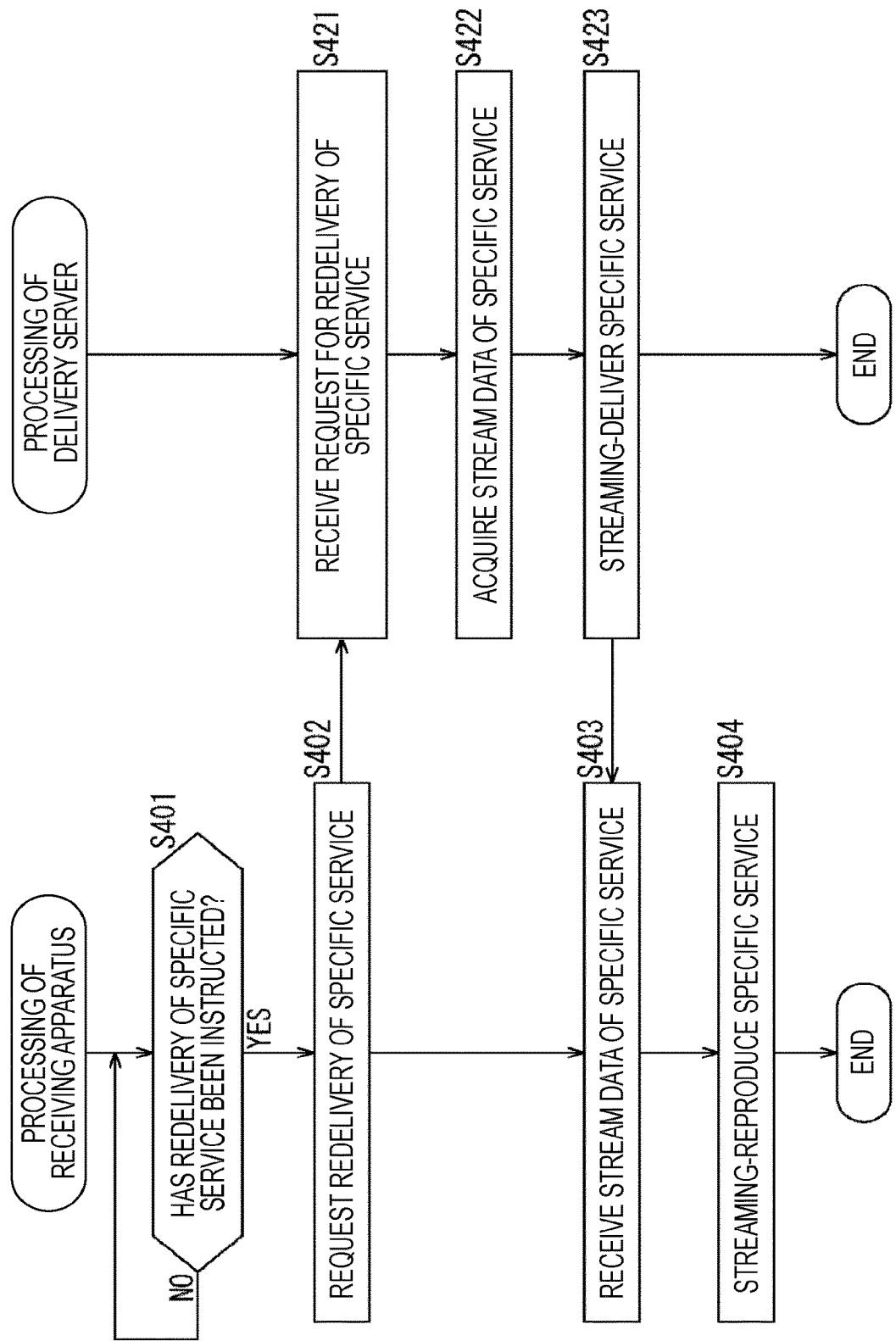
FIG. 15 is a flowchart illustrating streaming delivery processing.

Next, streaming delivery processing executed between the receiving apparatus 20 and the delivery server 40 that are illustrated in FIG. 7 will be described with reference to a flowchart illustrated in FIG. 15. In addition, in the flowchart illustrated in FIG. 15, processing in steps S401 to S404 is executed by the receiving apparatus 20, and processing in steps S421 to S423 is executed by the delivery server 40.

In step S401, it is determined whether redelivery of a specific service (e.g., communication content such as a broadcasted television program) has been instructed by the user manipulating the remote controller, for example. When it is determined in step S401 that the redelivery of the broadcasted television program has been instructed, the processing proceeds to step S402. In step S402, according to the control from the control unit 208, the communication unit 211 requests, via the Internet 90, the delivery server 40 to redeliver the broadcasted television program. Here, it is assumed that, for example, a provision source of a specific service such as a broadcasted television program is designated by the ID system illustrated in FIG. 4 that is constituted by combinations of original network IDs, BBP stream IDs, service IDs, and country codes.

In step S421, according to the control from the control unit 401, the communication unit 404 receives a request for redelivery of a specific service that is transmitted from the receiving apparatus 20 via the Internet 90. In step S422, based on the request for redelivery of the specific service, the control unit 401 acquires stream data of the specific service designated by the ID system illustrated in FIG. 4 that is included in the request for the redelivery, from among stream data of a plurality of services accumulated in the accumulation unit 403. In step S423, according to the control from the control unit 401, the communication unit 404 streaming-delivers the stream data acquired in response to the request for the redelivery, to the receiving apparatus 20 via the Internet 90.

In step S403, according to the control from the control unit 208, the communication unit 211 receives the stream data of the specific service that is streaming-delivered from the delivery server 40 via the Internet 90. In step S404, according to the control from the control unit 208, the video decoder 213 performs decoding processing, and supplies resultant video data to the video output unit 214. In addition, according to the control from the control unit 208, the audio decoder 215 performs decoding processing, and supplies resultant audio data to the audio output unit 216. The streaming reproduction of a specific service such as a broadcasted television program is thereby performed.

The streaming delivery processing has been described above. In the streaming delivery processing, the specific service provision source is designated by the ID system constituted by the combinations of original network IDs, BBP stream IDs, service IDs, and country codes. Thus, for example, from among stream data of television programs broadcasted in broadcast stations of each country that are accumulated in the delivery server 40, stream data of a specific television program can be acquired and streaming-delivered. In addition, in FIG. 15, the description has been given of an example in which the receiving apparatus 20 receives communication content redelivered from the delivery server 40. The same applies to a case in which the receiving apparatus receives broadcast content redelivered from the transmission apparatus 10 via the cable 80. Also in this case, a specific service provision source is designated by an ID system constituted by combinations of original network IDs, BBP stream IDs, service IDs, and country codes.

5. Modified Example (Another Structure of Signaling Information)

Figure 16:
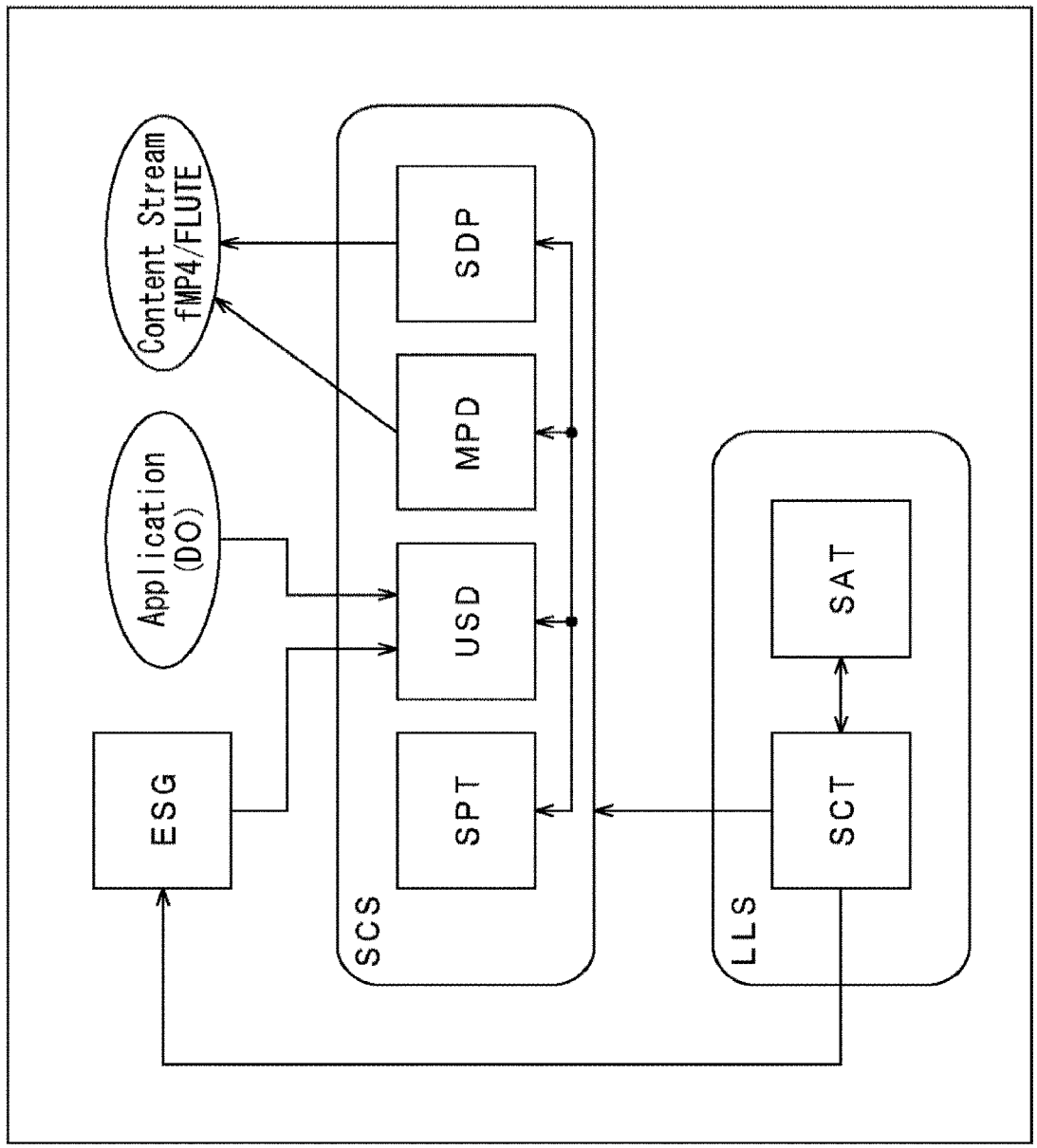
FIG. 16 is a diagram illustrating another example of a structure of signaling information.

FIG. 16 is a diagram illustrating another example of a structure of signaling information.

As compared with the above-described signaling information illustrated in FIG. 3, the signaling information illustrated in FIG. 16 differs in that a Service Parameter Table (SPT) is transmitted as SCS, aside from the SDP, the MPD, and the USD. The SPT includes various types of parameters defined with the levels of services and components. In the description provided above, it is assumed that an ID system constituted by original network IDs, BBP stream IDs, service IDs, and country codes is described in the SCT (LLS). Alternatively, the ID system may be described in this SPT (SCS).

6. Configuration of Computer

The above-described series of processes can be executed by hardware, and can be executed by software. When the series of processes are executed by software, programs constituting the software are installed on a computer. Here, the computer includes a computer built in dedicated hardware and a general-purpose personal computer that can execute various types of functions by installing various types of programs, for example.

Figure 17:
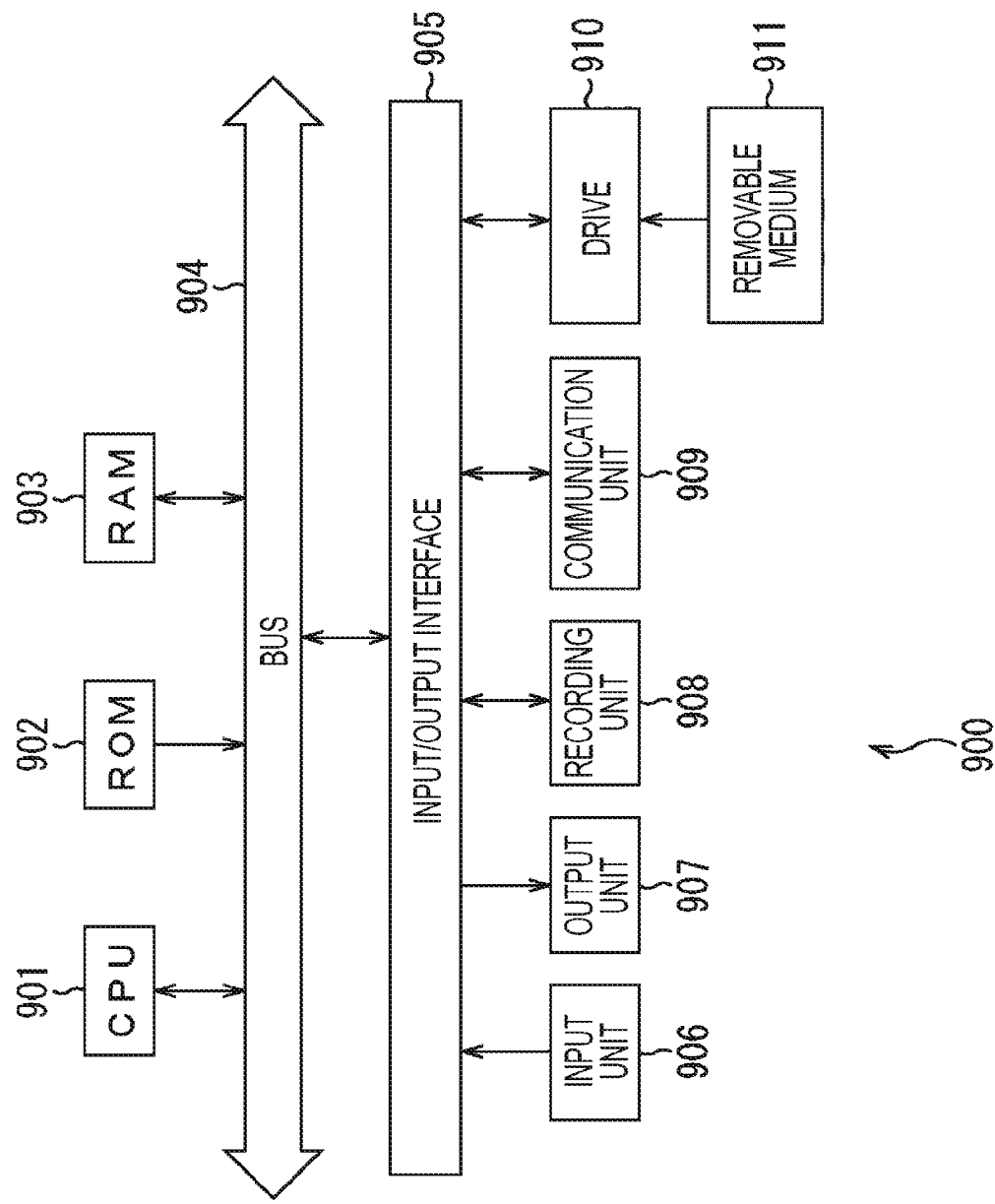
FIG. 17 is a diagram illustrating a configuration example of a computer.

FIG. 17 is a block diagram illustrating a configuration example of hardware of a computer that executes the above-described series of processes according to programs.

In a computer 900, a Central Processing Unit (CPU) 901, a Read Only Memory (ROM) 902, and a Random Access Memory (RAM) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 includes a keyboard, a mouse, a microphone, and the like. The output unit 907 includes a display, a loudspeaker, and the like. The recording unit 908 includes a hard disc, a nonvolatile memory, and the like. The communication unit 909 includes a network interface and the like. The drive 910 drives a removable medium 911 such as a magnetic disc, an optical disk, a magneto-optical disk, a semiconductor memory, or the like.

In the computer 900 having the above-described configuration, the above-described series of processes are performed by the CPU 901 loading programs stored in, for example, the recording unit 908, into the RAM 903 via the input/output interface 905 and the bus 904, and executing the programs.

The programs executed by the computer 900 (the CPU 901) can be provided with being recorded on, for example, the removable medium 911 serving as a package medium or the like. In addition, the programs can be provided via a wired or wireless transmission medium such as a local area network, the Internet, and digital satellite broadcasting.

In the computer 900, the programs can be installed on the recording unit 908 via the input/output interface 905 by attaching the removable medium 911 to the drive 910. In addition, via a wired or wireless transmission medium, the programs can be received by the communication unit 909 and installed on the recording unit 908. In addition, the program can be preinstalled on the ROM 902 and the recording unit 908.

In addition, programs executed by the computer 900 may be programs according to which processes are chronologically performed in the order described in this specification. Alternatively, the programs may be programs according to which processes are performed in parallel, or at necessary timings such as a timing when call-out is performed.

Here, in this specification, processing steps in which programs for causing the computer 900 to perform various types of processes are described do not necessarily have to be chronologically processed in the orders described as flowcharts, and include processes executed in parallel or individually (for example, parallel processing or processing performed by an object).

In addition, the programs may be programs processed by a single computer, or may be programs processed by a plurality of computers in a distributed manner. Furthermore, the programs may be programs transferred to a distant computer to be executed.

Furthermore, in this specification, a system means a set of a plurality of constituent elements (apparatuses, modules (parts), and the like), and it does not matter whether or not all the constituent elements are provided in the same casing. Thus, a plurality of apparatuses stored in separate casings and connected via a network, and a single apparatus in which a plurality of modules is stored in a single casing are both regarded as systems.

In addition, an embodiment of the present technology is not limited to the above-described embodiment, and various changes can be made without departing from the scope of the present technology. For example, the present technology can employ a configuration of cloud computing in which a single function is shared by a plurality of apparatuses and processed in cooperation with each other, via a network.

In addition, instead of being executed in a single apparatus, each step described in the above-described flowcharts can be executed by a plurality of apparatuses in a shared manner. Furthermore, when a plurality of processes is included in a single step, the plurality of processes included in the single step can be executed by a plurality of apparatuses in a shared manner, instead of being executed in a single apparatus.

In addition, the present technology can employ the following configurations.

(1)

A receiving apparatus including:

a receiving unit configured to receive a broadcast wave of digital broadcasting employing an Internet Protocol (IP) transmission scheme; and a control unit configured to identify a specific service provision source according to a combination of an original network ID allocated as a value unique to each broadcasting operator and having a same value succeeded in retransmission of a specific service, a stream ID allocated as a value unique to each stream, and a service ID allocated as a value unique to each service that is included in a control signal transmitted via the broadcast wave, and to control a function of each unit for performing predetermined processing related to the specific service.

(2)

The receiving apparatus according to (1), wherein the control signal further includes a country code allocated to each country, and the control unit identifies the specific service provision source according to a combination of the original network ID, the stream ID, the service ID, and the country code.

(3)

The receiving apparatus according to (1) or (2), wherein the specific service is streaming-delivered from a server via Internet.

(4)

The receiving apparatus according to any one of (1) to (3), wherein an electronic service guide of the specific service is provided from a server via Internet.

(5)

The receiving apparatus according to (1), wherein the original network ID is allocated by a public agency, and the stream ID and the service ID are allocated by each broadcasting operator.

(6)

The receiving apparatus according to (2), wherein a country code of a public agency is designated as the country code.

(7)

The receiving apparatus according to any one of (1) to (6), wherein the control signal is described in an Extensible Markup Language (XML) format.

(8)

A receiving method of a receiving apparatus, the receiving method including following steps executed by the receiving apparatus:

receiving a broadcast wave of digital broadcasting employing an IP transmission scheme; and identifying a specific service provision source according to a combination of an original network ID allocated as a value unique to each broadcasting operator and having a same value succeeded in retransmission of a specific service, a stream ID allocated as a value unique to each stream, and a service ID allocated as a value unique to each service that is included in a control signal transmitted via the broadcast wave, and controlling a function of each unit for performing predetermined processing related to the specific service.

(9)

A transmission apparatus including:

a first acquisition unit configured to acquire components constituting one or a plurality of services;

a second acquisition unit configured to acquire a control signal including a combination of an original network ID allocated as a value unique to each broadcasting operator and having a same value succeeded in retransmission of a specific service, a stream ID allocated as a value unique to each stream, and a service ID allocated as a value unique to each service; and a transmission unit configured to transmit a broadcast wave being a broadcast wave of digital broadcasting employing an IP transmission scheme, and including the components constituting the one or the plurality of services and the control signal.

(10)

A transmission method of a transmission apparatus, the transmission method including following steps executed by the transmission apparatus:

acquiring components constituting one or a plurality of services;

acquiring a control signal including a combination of an original network ID allocated as a value unique to each broadcasting operator and having a same value succeeded in retransmission of a specific service, a stream ID allocated as a value unique to each stream, and a service ID allocated as a value unique to each service; and transmitting a broadcast wave being a broadcast wave of digital broadcasting employing an IP transmission scheme, and including the components constituting the one or the plurality of services and the control signal.

REFERENCE SIGNS LIST 1 broadcast communication system
10 transmission apparatus
20 receiving apparatus
30 ESG server
40 delivery server
80 cable
90 Internet
101 component acquisition unit
102 control signal acquisition unit
104 transmission unit
202 tuner
208 control unit
211 communication unit
900 computer
901 CPU

The invention claimed is:

1. A receiving apparatus comprising:
circuitry configured to:
receive a packet stream of digital broadcasting employing an Internet Protocol (IP) transmission scheme;
obtain identification information provided in the received packet stream via a protocol layer above a physical layer in a protocol stack for identifying a service provision source of a specific service, the protocol layer being different from an IP layer in the protocol stack, the identification information including a combination of at least an original network identifier, a stream identifier, and a service identifier that are provided in the received packet stream, the original network identifier being allocated as a value identifying an original broadcasting operator of the specific service, the stream identifier being allocated as a value identifying the packet stream that includes the specific service, and the service identifier being allocated as a value identifying the specific service, wherein the original network identifier, the stream identifier, and the service identifier are unchanged in retransmission of the specific service, and the packet stream is arranged in the protocol stack adjacent to and interposed between the IP layer and the physical layer; and
transmit a request to a server for acquiring data related to the specific service, the data being designated by the identification information that is included in the request.

2. The receiving apparatus according to claim 1, wherein the identification information includes a combination of the original network identifier, the stream identifier, the service identifier, and a country code identifying a country of the original broadcasting operator.

3. The receiving apparatus according to claim 2, wherein a country code of a public agency is designated as the country code.

4. The receiving apparatus according to claim 1, wherein the request for acquiring the data corresponds to acquiring the data related to the specific service from the server via Internet.

5. The receiving apparatus according to claim 1, wherein the request for acquiring the data corresponds to acquiring an electronic service guide of the specific service from the server via Internet.

6. The receiving apparatus according to claim 1,
wherein the original network identifier is allocated by a public agency, and
the stream identifier and the service identifier are allocated by the original broadcasting operator.

7. The receiving apparatus according to claim 1, wherein the identification information is described in an Extensible Markup Language (XML) format.

8. The receiving apparatus according to claim 1, wherein the packet stream includes a plurality of base band packets each constituted by a base band packet header and a payload.

9. The receiving apparatus according to claim 1, wherein the protocol layer is a low layer signaling (LLS) layer configured to carry service configuration information.

10. A receiving method for a receiving apparatus, comprising:
receiving a packet stream of digital broadcasting employing an IP transmission scheme;
obtaining, by circuitry of the receiving apparatus, identification information provided in the received packet stream via a protocol layer above a physical layer in a protocol stack for identifying a service provision source of a specific service, the protocol layer being different from an IP layer in the protocol stack, the identification information including a combination of at least an original network identifier, a stream identifier, and a service identifier that are provided in the received packet stream, the original network identifier being allocated as a value identifying an original broadcasting operator of the specific service, the stream identifier being allocated as a value identifying the packet stream that includes the specific service, and the service identifier being allocated as a value identifying the specific service, wherein the original network identifier, the stream identifier, and the service identifier are unchanged in retransmission of the specific service, and the packet stream is arranged in the protocol stack adjacent to and interposed between the IP layer and the physical layer; and
transmitting a request to a server for acquiring data related to the specific service, the data being designated by the identification information that is included in the request.

11. The receiving method according to claim 10, wherein the identification information includes a combination of the original network identifier, the stream identifier, the service identifier, and a country code identifying a country of the original broadcasting operator.

12. The receiving method according to claim 10, wherein the identification information is described in an Extensible Markup Language (XML) format.

13. The receiving method according to claim 10, wherein the packet stream includes a plurality of base band packets each constituted by a base band packet header and a payload.

14. The receiving method according to claim 10, wherein the protocol layer is a low layer signaling (LLS) layer configured to carry service configuration information.

* * * * *